United States Patent [19]

Gennari et al.

[11] Patent Number: 5,372,235
[45] Date of Patent: Dec. 13, 1994

[54] HANDLING-SWITCHING APPARATUS WITH CONVEYOR TABLES APT TO BE INCLINED, WITH UNLOADING ACTUATING DEVICES CONTROLLED BY SAID CONVEYOR TABLES

[75] Inventors: Nedo Gennari; Andrea Faure, both of Genova, Italy

[73] Assignee: Finmeccanica S.p.A., Rome, Italy

[21] Appl. No.: 181,896

[22] Filed: Jan. 18, 1994

[30] Foreign Application Priority Data

Feb. 19, 1993 [IT] Italy ............... MI93A0000310

[51] Int. Cl.5 ............................................ B65G 47/46
[52] U.S. Cl. .................................... 198/365; 198/372
[58] Field of Search ............... 198/365, 360, 370, 372, 198/795, 797, 798, 799, 800, 802; 105/241.2, 155; 104/94

[56] References Cited

U.S. PATENT DOCUMENTS

| | | | |
|---|---|---|---|
| 3,550,748 | 12/1970 | Hauer | 198/365 |
| 3,618,745 | 11/1971 | Dominici | 198/365 |
| 4,763,771 | 8/1988 | Geerts | 198/365 |
| 4,938,335 | 7/1990 | Canziani | 198/365 |
| 5,161,930 | 11/1992 | Canziani | 198/365 X |
| 5,181,597 | 1/1993 | Geerts | 198/365 |

*Primary Examiner*—D. Glenn Dayoan
*Attorney, Agent, or Firm*—Notaro & Michalos

[57] ABSTRACT

This invention proposes a handling-switching apparatus in which the pieces to be handled are placed on conveyor tables constituted by rotating carpets that are inclined and set to rotation to unload the piece into collecting vessels suitably preset. A cam device is provided to control the unloading of the piece, which are operated and subsequently brought again to a non-operative position by the carriage itself while moving forward, so as to avoid the risk of breakage.

5 Claims, 5 Drawing Sheets

HANDLING-SWITCHING APPARATUS WITH CONVEYOR TABLES APT TO BE INCLINED, WITH UNLOADING ACTUATING DEVICES CONTROLLED BY SAID CONVEYOR TABLES

FIELD AND BACKGROUND OF THE INVENTION

This invention proposes a handling-switching apparatus including a number of conveyor tables, each constituted by a rotating carpet on which the piece to be handled is placed and that performs unloading into collecting vessels that are determined at the moment of introducing the piece into the machine, said collecting vessels being placed along the path below the carpets. A handling-switching apparatus of this kind is already known from the Italian Patent Application No. MI9-1A2213 dated Jun. 6, 1991, of the same applicant.

SUMMARY OF THE INVENTION

A characteristic of the handling-switching apparatus according to the invention is providing the means that place the carpet in an inclined position and set it to rotation such that they are directly operated by the carriage on which the carpet is mounted, so as to avoid the risk of breakages due to an untimely operation of the same.

More in detail in the handling-switching apparatus according to the invention each carpet is mounted on a carriage that is in turn provided with a central shaft connected to a pair of dragging chains.

The carpet supporting rollers are mounted on shafts that are fitted, on one side, with a pair of wheels, one of which is idle, that run on a rail track placed along the path, thereby keeping the carpet in the horizontal position.

Such rail track has some movable parts that are lifted at the moment of unloading, so as to engage the pair of wheels present at an end of the carriage, deviating it beneath the rail track, so as to bring the carriage in an inclined position.

The movements of the rail track movable section are controlled by a cam integrally connected with the carriage supporting shaft, while the return to the previous position is operated by the same wheels that are deviated towards the rail track lower part.

By this way the movements of the rail track movable part are directly controlled by the carriage involved in the unloading operation, thus avoiding the risk of breakages due, for instance, to a delayed operation of the movable wall.

BRIEF DESCRIPTION OF THE INVENTION

This invention will now be described in detail, in a non-limiting example, referring to the attached figures, where:

DESCRIPTION OF THE PREFERRED EMBODIMENT

Figure 1:
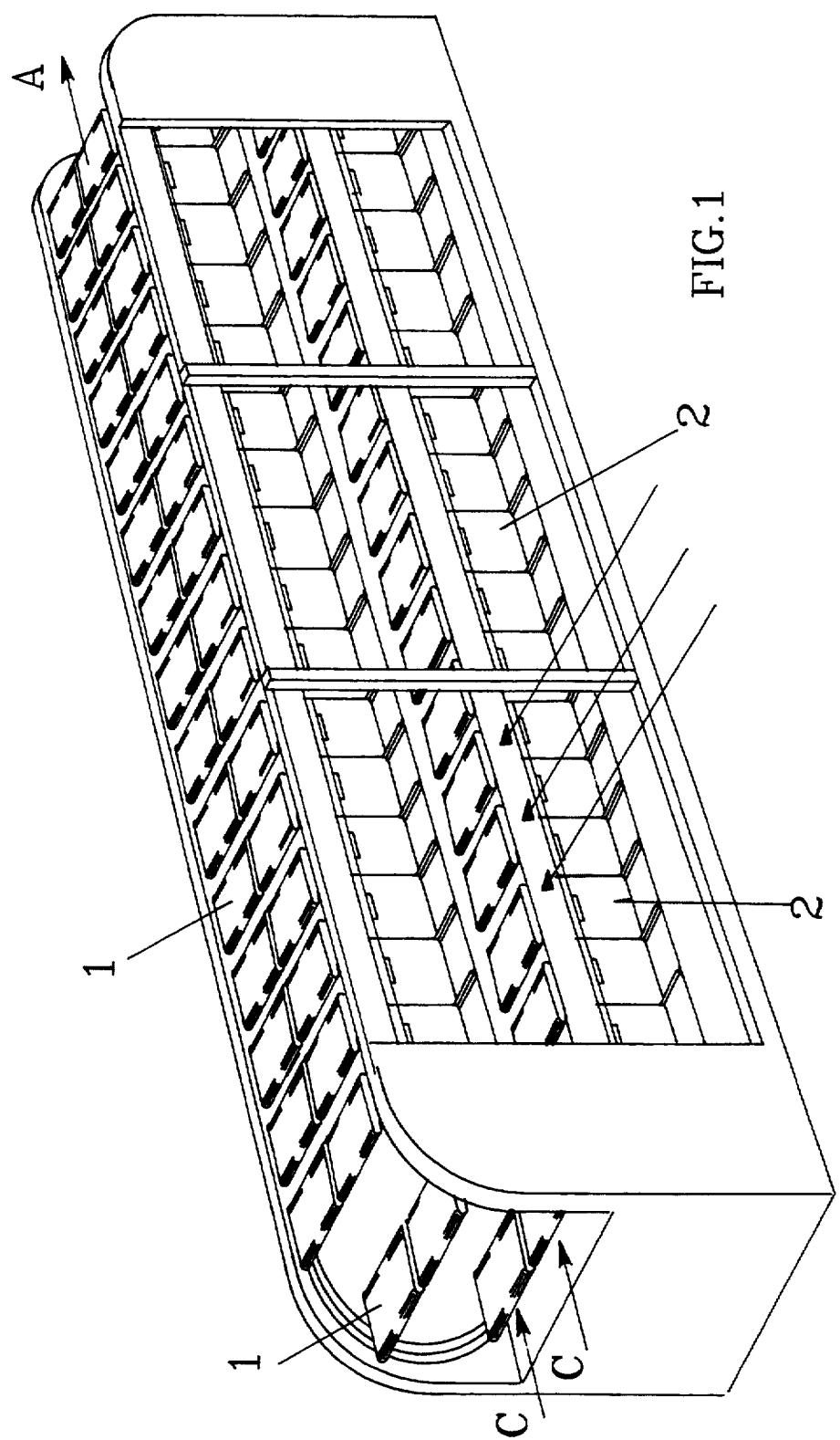
FIG. 1 is a perspective view of an apparatus according to the invention.

With reference to FIG. 1, the apparatus according to the invention is constituted by a number of conveyor tables, each indicated by 1, consisting of a series of rotating carpets arranged in two rows side by side, each row developing along a loop-shaped path, on a vertical plane.

The carpets move for instance in the direction of arrow A when they run along the upper section and move on the contrary in the opposite direction in the return section.

Forward (A) and return paths are therefore superposed and the pieces to be handled are loaded on the machine while they follow the section connecting the forward to the return path.

Loading can then take place at both head ends of the machine, in correspondence with coding and loading stations of a known type and as schematically represented by arrows indicated by C in FIG. 1, in which an operator inputs into a computer that manages the apparatus the piece destination, for instance by means of a bar code or through a keyboard.

The operator places the piece on a tape which inserts it into the machine loading it onto the carpet that the computer has assigned to such specific piece while the carpet follows, as said, the connecting section between the forward and return paths.

The carpets move in a substantially horizontal position and are inclined at the moment of unloading only, when they are also set to rotation in order to unload the piece.

Figure 3:
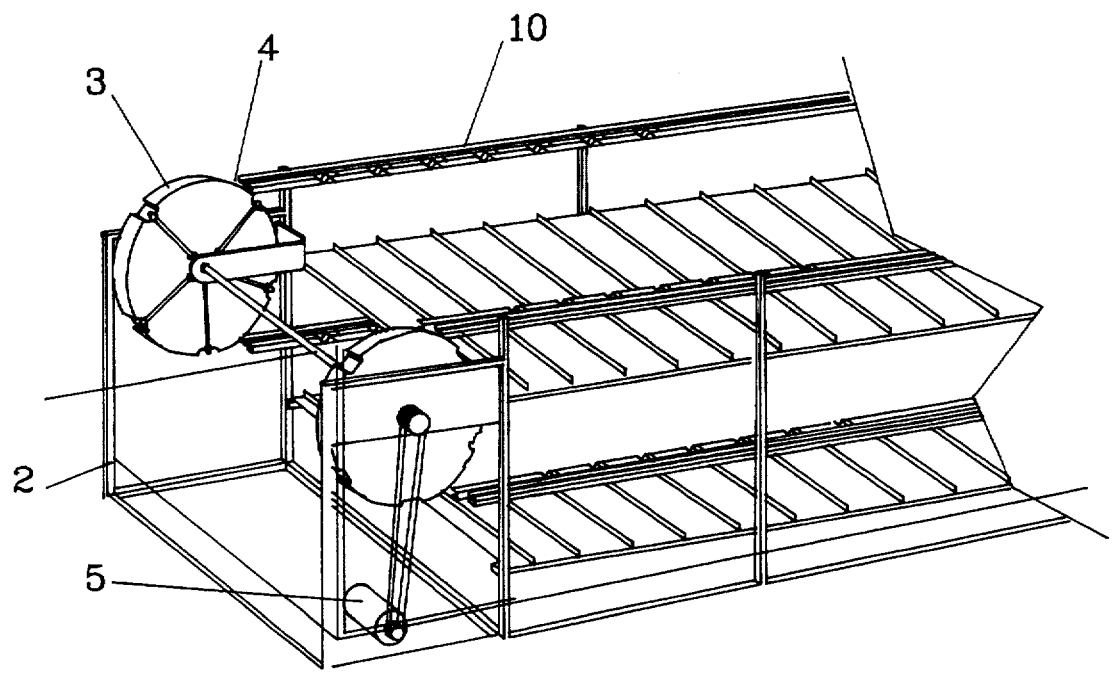
FIG. 3 is the perspective view of a part of the carpet dragging devices in an apparatus according to the invention.

The apparatus (see FIG. 3) includes a supporting frame 2 on which a pair of wheels 3 or the like are mounted, that drag as many chains or belts 4 that in turn drag the carpets.

Wheels 3 are set to rotation on their axle by an electric motor 5.

Every carpet is mounted on a tiltable frame 6 (FIG. 2) which is in turn mounted on a supporting shaft 7 that is engaged with belts 4. The belts therefore drag shafts 7, that in turn cause the frames 6 with carpets 1 to move forward.

Every carpet 1 is mounted on the respective frame 6 by means of a pair of idle rollers on the shafts of which as many pairs of wheels are mounted, specifically, an internal wheel 8 integrally connected with the carpet shaft and an external one, 9 which is idle.

Figure 4:
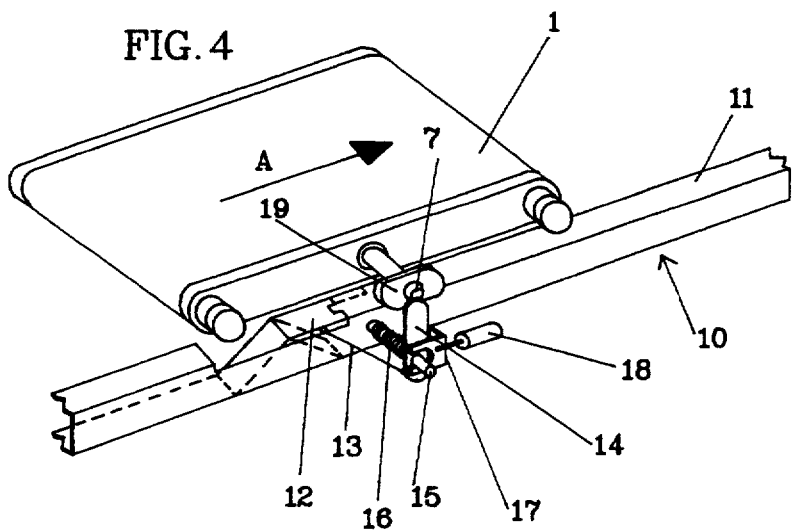
FIGS. 4 and 5 show the perspective view of the unloading operating devices during, respectively, the passage of a carriage not involved in unloading and of a carriage that, on the contrary, must perform unloading.

Rail tracks 10 substantially constituted by "C"-shaped profile irons are placed along the path, and during movement of the carpet, the wheels 8 and 9 normally lean on the upper flange 11 of such rail tracks (FIG. 4).

In such sections, consequently, the carriages keep in the horizontal position by virtue of the wheels that lean on the respective rail tracks.

Flange 11 is not continuous but has some movable parts, indicated by 12, which can be lifted and lowered.

A connecting rod 13 as shown in FIG. 4 is hinged to each movable part or plate 12, said connecting rod being in turn hinged on a lever 14.

Lever 14 is mounted so as to slide on a supporting pin 15, relative to which it can move in opposition to elastic means, such as for instance a helical spring 16 or the like.

Figure 5:
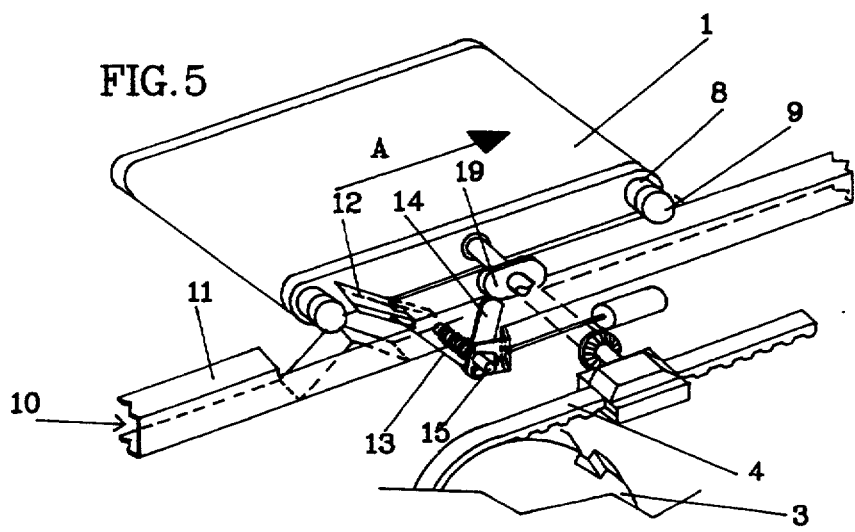

An L-shaped stirrup 17, operated by a piston 18, causes lever 14 to slide along pin 15, taking it from a position in which the lever is at a certain distance from rail track 10 (FIG. 4) to a closer position where lever 14 goes to interfere with the path of a cam 19 integrally connected with shaft 7 (FIG. 5).

Figure 6:
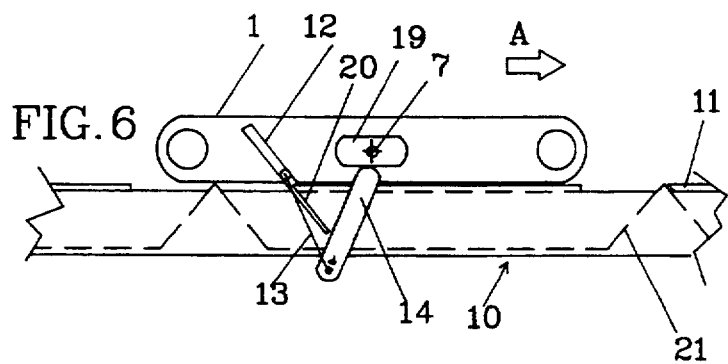
FIGS. 6 and 7 are the side views of the unloading operating devices during two steps of said operation.

During the carpet feed, cam 19 engages lever 14 causing it to rotate on pin 15 and operating by this way the connecting rod 13 to lift movable plate 12, as shown in FIGS. 5 and 6. This combination of elements is here referred to as cam means.

Plate 12 has an appendix 20 that, following the plate rotation lowers and takes an inclined position inside the "C"-shaped profiled iron that constitutes rail track 10.

The "C"-shaped profiled iron has, in corresponcence with the internal lower part, a raised section 21 on which idle wheel 9 leans when following the rail track internal section.

The wheel 8, which is integrally connected to the roller, shaft has a diameter slightly greater with respect to idle wheel 9.

Figure 11:
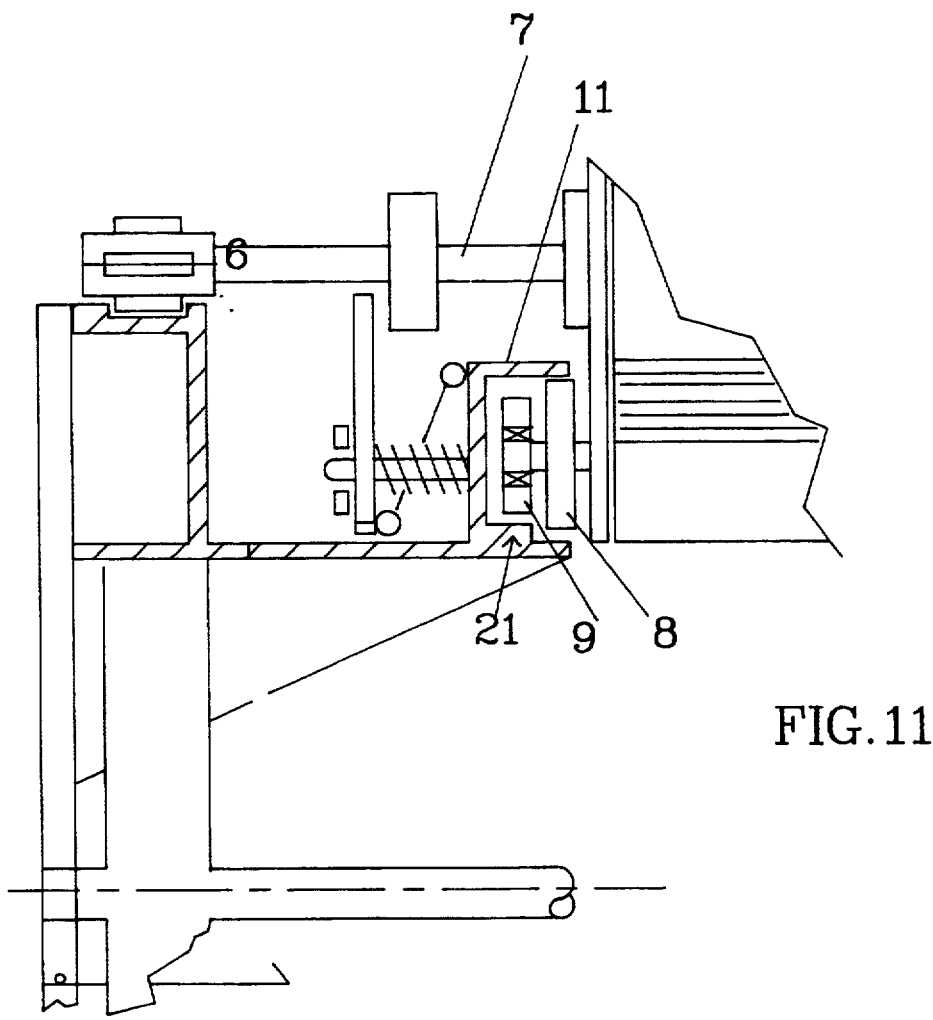
FIG. 11 is the section of a detail of the machine in correspondence with the devices that drive the strip support during the passage of the carriage from forward to return path.

Then, when the carriage is in an inclined position, with its wheels inside the "C"-shaped profiled iron as shown in FIG. 11, wheel 9 leans on relief 21 and pushes wheel 8 upwards, pressing it against the lower surface of flange 11, thus causing wheel 8 and the respective roller and the carpet to rotate by virtue of friction.

Operation goes on in the following way:

When the carriage with the carpet that conveys the piece comes close to the assigned unloading area, the machine control devices operate piston 18 that causes stirrup 17 to rotate, which presses on lever 14 causing it to slide on pin 15 in opposition to the force exerted by spring 16, until it is brought in correspondence with the path of cam 19 which is integrally connected to shaft 7.

The latter, as a consequence of the carriage feed, engages lever 14 causing it to rotate and thereby operating connecting rod 13 to lift mobile wall 12, taking it to the position shown in FIGS. 5 and 6.

Then the carriage itself operates the control means of mobile plate 12, thus avoiding the risk that the same be lifted untimely.

Figure 2:
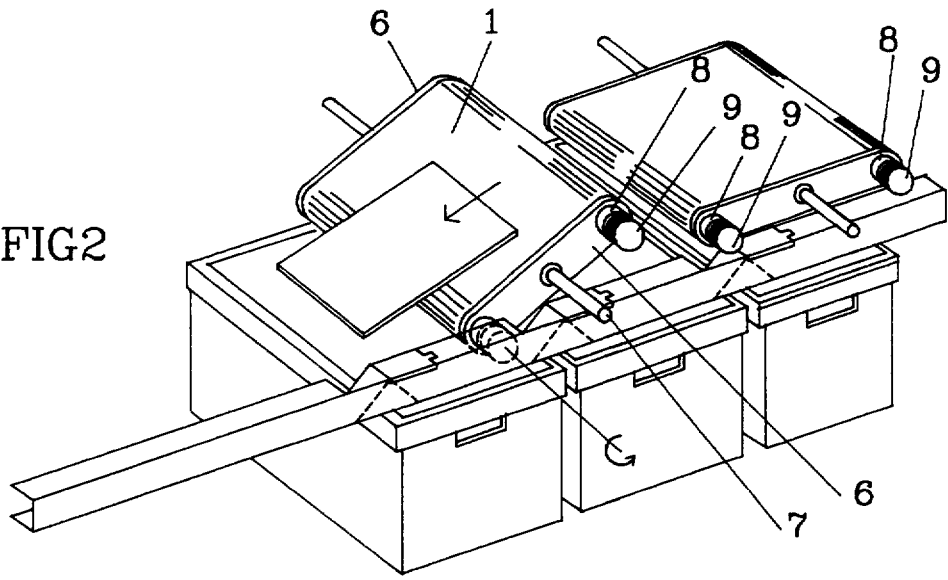
FIG. 2 shows the detail of a carpet during the conveyed piece unloading step.
Figure 7:
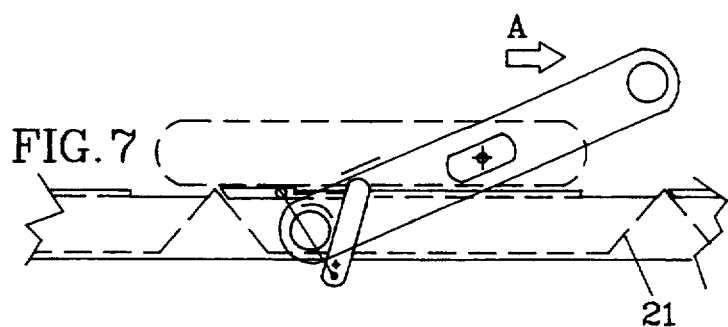
Figure 8:
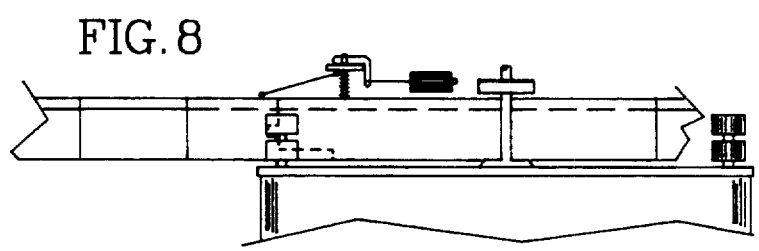
FIGS. 8 and 9 are the top plan views of the devices of FIGS. 6 and 7.
Figure 9:
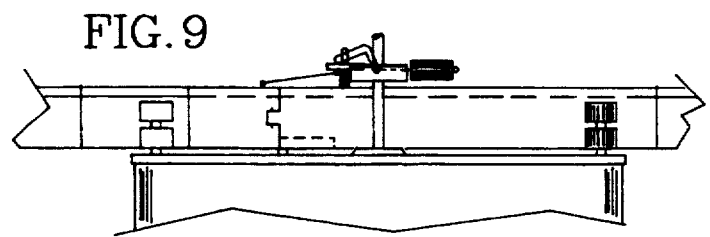
Figure 10:
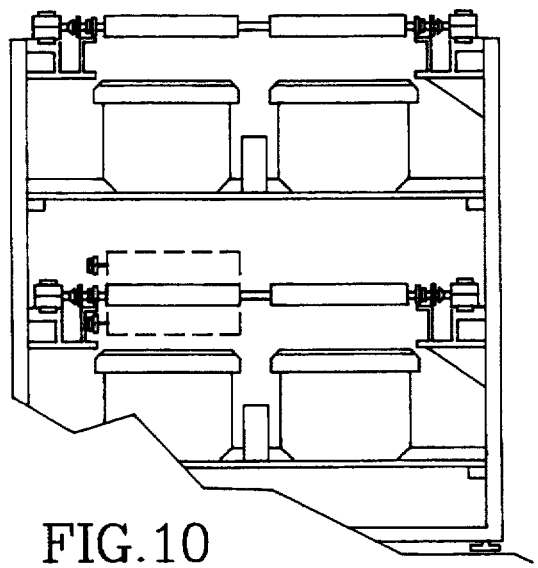
FIG. 10 is a vertical section of the machine according to the invention.

The rear wheel of the carriage (that proceeds according to arrow A) is then deviated by inclined wall 12 that directs it to the internal part of the "C"-shaped profiled iron, which causes the carpet to incline, taking it to the position of FIGS. 2 and 7.

As the carriage proceeds, wheel 9 engages the appendix 20 of plate 12, taking it to the horizontal position and assuring by this way the continuity of the rail track when the successive carriage arrives.

The revolving speed of carpet 1 is a function of the dimensions of supporting rollers and relevant wheels 8, it is therefore possible, by properly sizing such elements, to cause the piece to be unloaded at zero absolute speed or at an extremely low speed.

When the carriage has proceeded by one step, the wheels inside the "C"-shaped profiled iron encounter an upward slope, indicated by 21 in FIGS. 6 and 7, therefore they take the carriage back to the horizontal starting position.

A skilled person will then be able to plan many modifications and changes, that shall anyway be deemed to be all comprised within the scope of this invention.

We claim:

1. A handling-switching apparatus comprising:
   means defining a fixed path;
   a belt mounted for movement along the path;
   a plurality of conveyor tables connected to the belt and dragged by the belt along the fixed path, each conveyor table comprising a carriage having a supporting shaft which is rotatable for tilting the carriage on the fixed path, a pair of carpet shafts with idle rollers mounted to the carriage, a carpet mounted for movement around the carpet shafts and idle rollers and moveable for unloading a piece from the conveyor table, and a pair of wheels connected to each carpet shaft;
   a rail track having a c-shaped profile extending along at least part of the fixed path, said rail track having an upper flange on which said wheels are guided during at least part of the movement of each conveyor table along the fixed path, the upper flange including a plurality of openings spaced therealong;
   a liftable section for each opening, each liftable section being mounted for movement to the rail track between an open position for clearing the opening, and a closed position for closing the opening, the wheel of a carriage passing the cleared opening with movement of the conveyor table along the path, moving into the opening for tilting the conveyor table on the supporting shaft; and
   cam means connected to each liftable section and engagable by a conveyor table passing the cam means for moving the liftable section between its closed and open positions for selectively allowing a wheel of a carriage to enter the opening for tilting the conveyor table of the carriage to unload a piece from the carpet.

2. A handling-switching apparatus according to claim 1, wherein the rail track having the c-shaped profile has a raised section and a rail track flange, each pair of wheels of each carriage being a large diameter wheel which is engageable against the rail track flange for causing rotation of the large diameter wheel with relative movement between the carriage and the rail track when the carriage is tilted, each carriage including an idle wheel connected to the carriage adjacent each large diameter wheel, each idle wheel being engageable against the raised section when the carriage is tilted for forcing the large diameter wheel against the rail track flange for rotating the carpet.

3. A handling-switching apparatus according to claim 1, wherein each liftable section includes an appendix which, with the liftable section in its open position clearing the opening, extends into the rail track, a wheel of a carriage which has moved into the opening, moving against the appendix for returning the liftable section into its closed position.

4. A handling-switching apparatus according to claim 1, wherein the cam means comprises a cam connected to the supporting shaft of each carriage, a lever mounted for rotation to the rail track at each opening, a rod connected between the lever and the liftable section at each opening, biasing means for biasing the lever into a position where the lever is out of a path of movement of the cam when each carriage passes the lever, a stirrup mounted for movement adjacent each lever, and a piston connected to each stirrup and activatable for moving each stirrup to move a respective lever into the path of movement of the cam of a carriage so that when a carriage approaches an opening, the cam engages the lever to rotate the lever which moves the liftable section from its closed position to its open position, to clear the opening and allow entry of a wheel to tilt a carriage.

5. A handling-switching apparatus according to claim 1, wherein the fixed path includes upper and lower horizontal sections and a pair of opposite vertical sections connecting the horizontal sections to each other to form the path into a continuous loop.

* * * * *